UNITED STATES PATENT OFFICE.

HERMANN HÜBENER, OF BERLIN, GERMANY.

BEVERAGE.

SPECIFICATION forming part of Letters Patent No. 455,103, dated June 30, 1891.

Application filed March 31, 1891. Serial No. 387,168. (No specimens.)

*To all whom it may concern:*

Be it known that I, HERMANN HÜBENER, of the city of Berlin, and Empire of Germany, a citizen of the Empire of Germany, have invented certain new and useful Improvements in Beverages, of which the following is a specification.

It is a well-known fact that the various natural mineral waters which are used as table waters are not as harmless as is usually supposed, owing to the presence of sodium bicarbonate in the same, which impairs the digestion, as it neutralizes the acid present in the stomach. The well-known Selters water, which is consumed in great quantities, contains, besides sodium bicarbonate, a considerable quantity of ordinary salt, (chloride of sodium,) which, instead of quenching thirst, on the contrary engenders the same, for which reason the use of these waters by people sick with fever is highly objectionable, as this sickness already diminishes the acid in the stomach, so that the latter contains, according to recent scientific researches, a relatively small quantity of hydrochloric acid. Other natural mineral table waters, of which large quantities were placed on the market during the last ten years, are open to the same objections, as they all contain sodium bicarbonate.

The artificial mineral waters are imitations of the natural waters and possess the same disadvantages. They are in most cases inferior to the natural mineral waters, and even more objectionable, owing to the imperfect admixture of the mineral ingredients.

The object of this invention is to supply an improved beverage which is entirely unobjectionable from a hygienic and sanitary point, and which possesses a more refreshing, thirst-quenching, and agreeable taste than the artificial table waters which contain the before-mentioned ingredients.

The invention consists of a beverage that is composed of an aqueous carbonated solution of sodium phosphate, sodium sulphate, and calcium carbonate, and which is preferably prepared in the following manner and proportions: One thousand grams of distilled water free of atmospheric air are mixed with hydrated sodium phosphate 0.73 gram, hydrated sodium sulphate 1.29 gram, and calcium carbonate 0.15 gram.

The addition of calcium carbonate forms by reaction with the sodium sulphate and the carbonic acid with which the beverage is charged a very small quantity of calcium sulphate and sodium bicarbonate.

The sodium phosphate, as well as the sodium sulphate, act as sedatives on the human organism and exert a soothing and cooling influence on the same.

The beverage serves to allay irritation and possesses in a high degree the property of quenching the thirst, so that it can be used as a superior table water and for being dispensed from fountains containing the same.

Having thus described my invention, I claim as new and desire to secure by Letters Patent—

A beverage consisting of an aqueous carbonated solution of sodium phosphate, sodium sulphate, and calcium carbonate, substantially as and for the purpose set forth.

In testimony that I claim the foregoing as my invention I have signed my name in presence of two subscribing witnesses.

HERMANN HÜBENER.

Witnesses:
RICHARD SCHURICHT,
   22 *Michaelkirchplatz, Berlin, S. O.*
REINHARDT BRINK,
   *Elisabeth Ufer 43a, Berlin, S. O.*